United States Patent
Watanabe et al.

[11] Patent Number: 5,940,531
[45] Date of Patent: Aug. 17, 1999

[54] IMAGE SIGNAL PROCESSING APPARATUS

[75] Inventors: Tohru Watanabe, Ogaki; Toshio Nakakuki; Tatsuya Takahashi, both of Gifu-ken, all of Japan

[73] Assignee: Sanyo Electric Co., Ltd., Osaka, Japan

[21] Appl. No.: 08/759,364

[22] Filed: Nov. 22, 1996

[30] Foreign Application Priority Data

Nov. 30, 1995 [JP] Japan .................................. 7-338280

[51] Int. Cl.$^6$ ................................ G06K 9/00; H04N 1/56
[52] U.S. Cl. ........................ 382/165; 382/287; 382/291; 358/505; 358/488
[58] Field of Search .................................. 382/165, 164, 382/162, 282, 286, 287, 291, 295; 358/505, 515, 530, 538, 453, 488

[56] References Cited

U.S. PATENT DOCUMENTS

| | | | |
|---|---|---|---|
| 4,991,223 | 2/1991 | Bradley | 382/165 |
| 5,796,869 | 8/1998 | Tsuji et al. | 382/203 |
| 5,798,844 | 8/1998 | Sakano et al. | 358/401 |

FOREIGN PATENT DOCUMENTS 5-328099  10/1993  Japan .

*Primary Examiner*—Scott Rogers
*Attorney, Agent, or Firm*—Sheridan Ross P.C.

[57] ABSTRACT

Disclosed is an image signal processing apparatus that accurately detect the position of a specific portion of an object to be sensed. The image signal processing apparatus is adapted for an image sensing apparatus having an image sensing device for sensing an image of an object together with a target having a plurality of colors of different hues to produce an image signal. The image signal processing apparatus includes a color difference signal generation circuit, a detection circuit and a determining circuit. A color difference signal generation circuit, connected to the image sensing device, receives the image signal and produces a color difference signal. The detection circuit, connected to the color difference signal generation circuit, receives the color difference signal to detect if the color difference signal lies in a level range previously set in accordance with individual colors, and produces detection signals corresponding to the colors based on a detection result. The determining circuit, connected to the detection circuit, receives the detection signal and determines a position of the target in accordance with the detection signals.

6 Claims, 4 Drawing Sheets

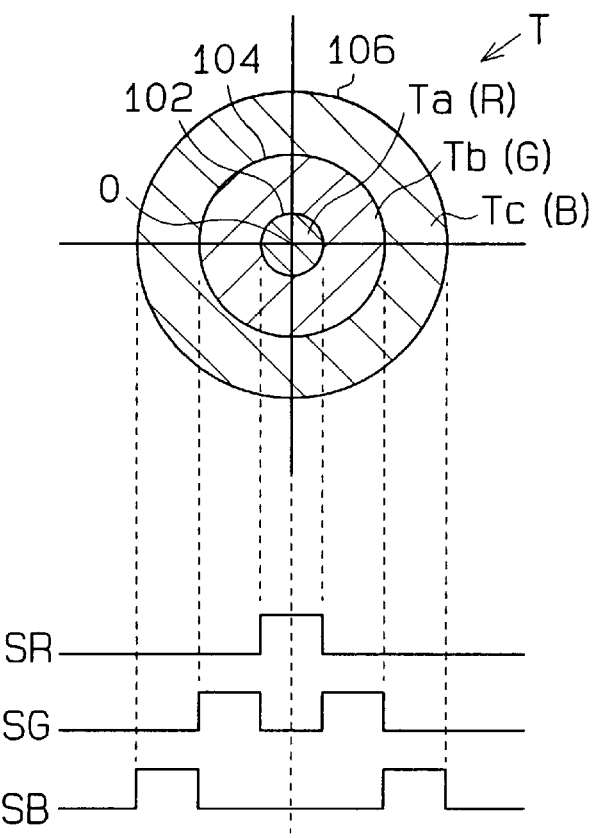
Fig.1A
Fig.1B
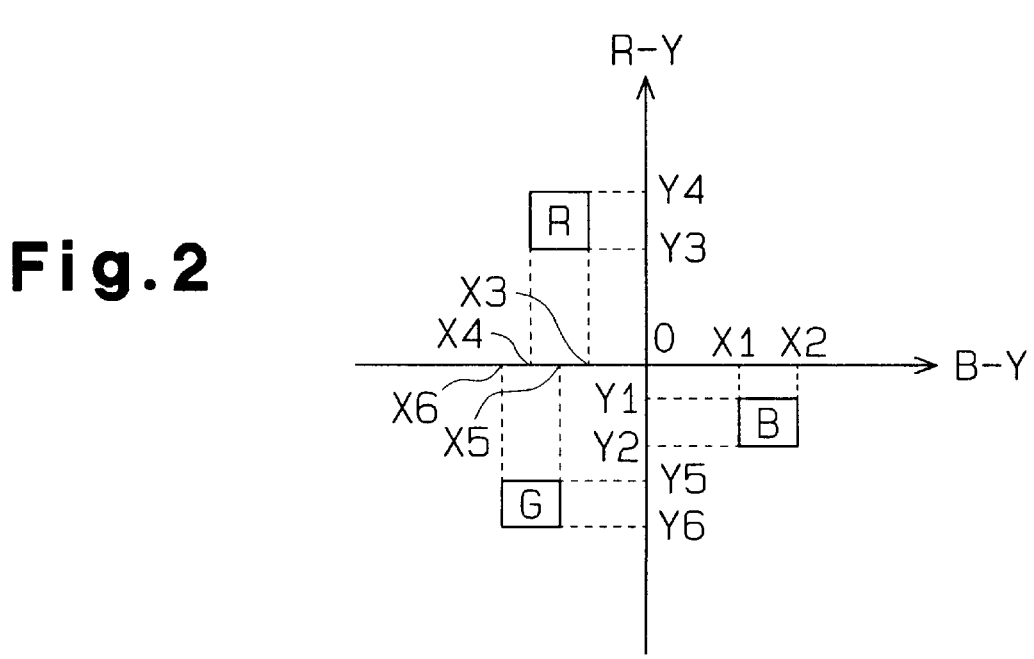
Fig.2

IMAGE SIGNAL PROCESSING APPARATUS

BACKGROUND OF THE INVENTION

1. Field of the Invention

The present invention relates to an image signal processing apparatus, and, more particularly, to an image signal processing apparatus that detects the position of a specific part of an object.

2. Description of the Related Art

In reading information on an original or a document as image signals (image data) using an image scanner, the image scanner should be placed at the desired position over the document. Conventionally, operators positioned each document visually, Such positioning is troublesome to operators and is likely to result in inaccurate scanning results. To overcome this shortcoming, there has been proposed a document positioning scheme that permits an image sensor to detect a mark previously put on a document for the purpose of positioning, In this method, a mark having both the proper shape and color suitable for positioning of a document is previously put at an arbitrary position on a document. This mark defines an arbitrary area on the document to be scanned. When detecting this mark, the image scanner extracts information within the area defined by the mark and reads it as image signals. When such a mark is put on the upper left portion on the document, for example, information within an area of the size A4 is read as image signals.

A digital copying machine having a marker processing function has also been proposed. In the marker processing, a different process is executed for an area of a document encircled by a fluorescent color (marker) than that executed for an area not encircled. Japanese Patent Laid open No. 5-328099 discloses an image signal processing apparatus which allows an operator to designate any area of a plurality of areas marked with a fluorescent color and can then perform a different process for the designated area than that executed for the other areas.

No scheme has been proposed for positioning for a specific portion of an object to be sensed, unlike the aforementioned positioning of a document by the detention of a mark by an image scanner or by the marker processing function, in the field of image sensing technology, using a two-dimensionel CCD (Charge Coupled Device) solid state image sensing device. At present, the positioning of an object is performed on a visual basis by each operator. Such positioning is troublesome and is likely to lead to inaccurate positioning results. In particular, positioning of a specific portion of an object to be sensed is important to fix the image sensing range or area using a CCD solid state image sensing device.

SUMMARY OF THE INVENTION

Accordingly, it is an objective of the present invention to provide an image signal processing apparatus capable of accurately detecting the position of a specific portion of an object to be sensed.

In one aspect of the invention, an image signal processing apparatus is adapted for an image sensing apparatus having an image sensing device for sensing an image of an object together with a target having a plurality of colors of different hues to produce an image signal. The image signal processing apparatus includes a color difference signal generation circuit, connected to the image sensing device, for receiving the image signal and producing a color difference signal, a detection circuit, connected to the color difference signal generation circuit, for receiving the color difference signal, detecting if the color difference signal lies in a level range previously set in accordance with individual colors, and producing detection signals corresponding to the colors based on a detection result, and a determining circuit, connected to the detection circuit, for receiving the detection signals and determining a position of the target in accordance with the detection signals. The target may have a plurality of concentric circles and a single color is assigned to each of areas defined between adjoining concentric circles. The target may have first to third concentric circles, a first color is assigned to an area in the first concentric circle that is closest to the center, a second color is assigned to an area lying between the first concentric circle and the second concentric circle that is located outward of the first concentric circle, and a third color is assigned to an area lying between the second concentric circle and the third concentric circle that is located outward of the second concentric circle. In this case, it is preferred that the first to third colors are red, green and blue.

In another aspect of the invention, a plurality of detection circuits are provided in association with the colors, are connected in parallel to the generation circuit, and produce a plurality of detection signals corresponding to associated colors in parallel.

Yet another aspect of the invention, the detection circuit operates in a time divisional manner, screen by screen, in association with the colors, to produce detection signals corresponding to associated colors in serial.

The present invention can be implemented in numerous ways including as an apparatus and a method.

Other aspects and advantages of the invention will become apparent from the following description, taken in conjunction with the accompanying drawings, illustrating by way of example the principals of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1A is a front view showing a target for positioning which is used by an image signal processing apparatus embodying this invention;

FIG. 1B is a signal waveform diagram illustrating hue detection signals produced by sensing the target in FIG. 1A;

FIG. 2 is a characteristic diagram showing the level ranges of a first color difference signal B-Y and a second color difference signal R-Y corresponding to three colors in the target in FIG. 1A;

DETAILED DESCRIPTION OF THE PREFERRED EMBODIMENTS

Figure 3:
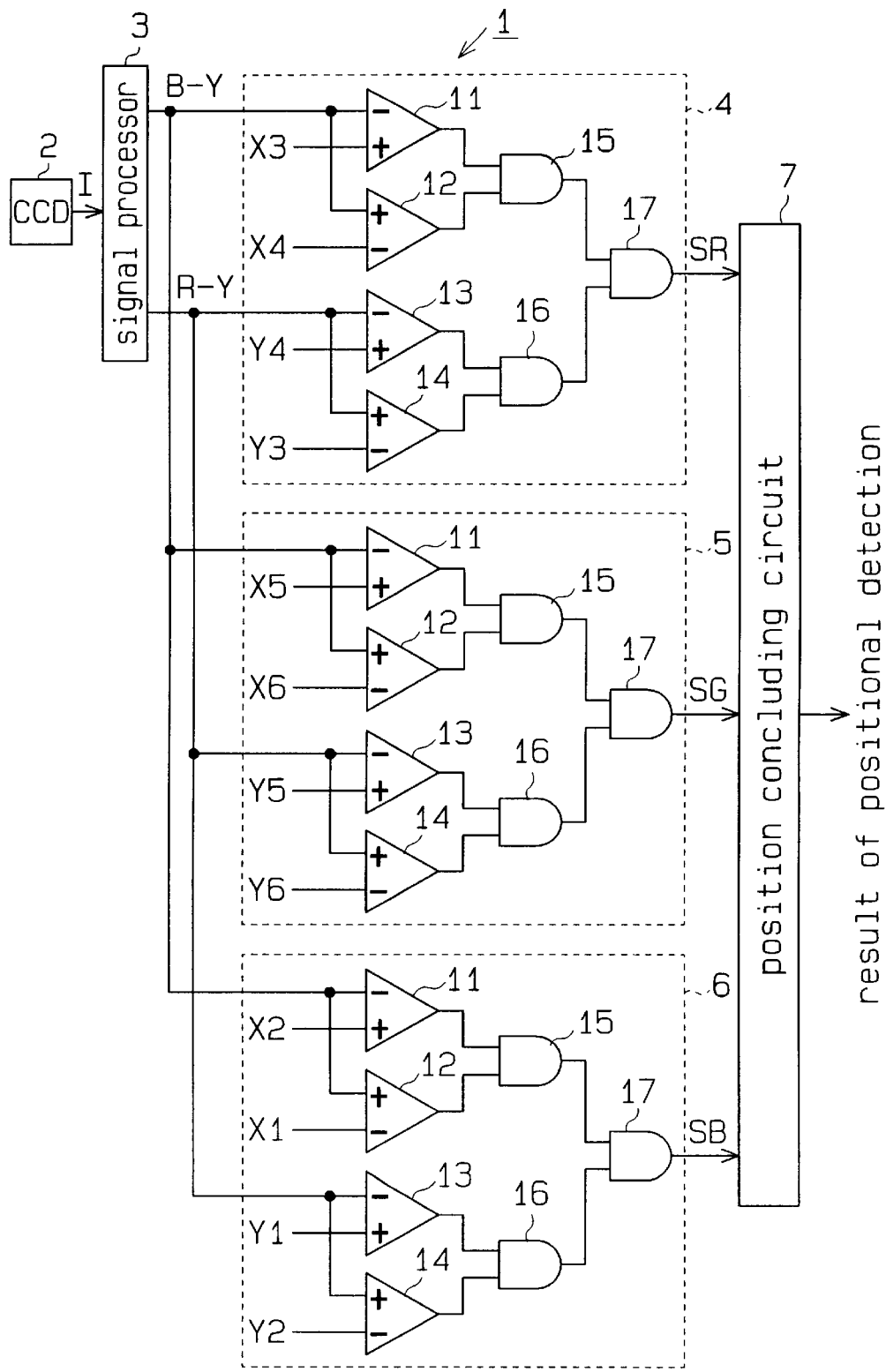
FIG. 3 is a block circuit diagram of an image signal processing apparatus according to the first embodiment of this invention.

The first embodiment of the present invention will now be described referring to the accompanying drawings.

FIG. 1A is a front view showing a target (mark) T for positioning which is used by an image signal processing apparatus according to the first embodiment of this invention. This target T is formed by three concentric circles 102, 104 and 106 having a common center O. A first area Ta(R) in the first concentric circle 102, the closest to the center, is red in color, and a second area Tb(G) lying between the contour of the first concentric circle 102 and the contour of the outerlying second concentric circle 104 is green. A third area Tc(B) lying between the contour of the second concentric circle 104 and the contour of the outerlying third concentric circle 106 is blue. The first to third areas Ta(R) to Tc(B) therefore form the three primary colors of light (R: red, G: green and B: blue). This target T is formed in the proper size in accordance with the resolution property of the image sensing apparatus in use.

The target T may consist of two areas defined by two concentric circles and those areas may be associated with two arbitrary colors selected from the three primary colors (R, G and B). The target T may consist of four or more areas defined by four or more concentric circles, in which case it is preferable that the hues of the individual areas be set sufficiently apart from one another. Further, the individual areas Ta(R) to Tc(B) of the target T may have colors that are different than the three primary colors (R, G and B). The areas of the target T may be formed by shapes other than concentric circles.

FIG. 2 shows the level ranges of the first and second color difference signals B-Y and R-Y for each of the first to third areas Ta(R) to Tc(B). A combination of the color difference signals B-Y and R-Y in an arbitrary level range defines a specific hue.

In the first area Ta(R), the first color difference signal B-Y corresponding to red lies in the level range given by equation (1) and the second color difference signal R-Y corresponding to red lies in the level range given by equation (2).

$$X4 \leq B-Y \leq X3 \quad (1)$$

$$Y3 \leq R-Y \leq Y4 \quad (2)$$

In the second area Tb(G), the first color difference signal B-Y corresponding to green lies in the level range given by equation (3) and the second color difference signal R-Y corresponding to green lies in the level range given by equation (4).

$$X6 \leq B-Y \leq X5 \quad (3)$$

$$Y6 \leq R-Y \leq Y5 \quad (4)$$

In the third area Tc(B), the first color difference signal B-Y corresponding to blue lies in the level range given by equation (5) and the second color difference signal R-Y corresponding to blue lies in the level range given by equation (6).

$$X1 \leq B-Y \leq X2 \quad (5)$$

$$Y2 \leq R-Y \leq Y1 \quad (5)$$

As shown in FIG. 3, an image signal processing apparatus 1 of the first embodiment, which is to be installed in an image sensing apparatus, comprises a signal processor 3, R, G and B hue detectors 4 to 6, and a position concluding circuit 7. The signal processor 3, connected to a well-known CCD solid state image sensing device 2, receives a sequence of image signals I pixel by pixel, output from the CCD solid state image sensing device 2. The signal processor produces analog color difference signals B-Y and R-Y from the image signal I. Specifically, three primary color signals R, G and B and an analog luminance signal Y are produced first from the image signal I. Then, the luminance signal Y is subtracted from the primary color signal R for red to yield the color difference signal R-Y. Subsequently, the luminance signal Y is subtracted from the primary color signal B for blue to yield the color difference signal B-Y. The signal processor 3 supplies the produced color difference signals B-Y and R-Y to the R, G and B hue detectors 4 to 6.

Each of the R, G and B hue detectors 4–6 includes four comparators 11 to 14 and three 2-input AND gates 15 to 17.

In the R hue detector 4, the comparator 11 has a negative input terminal for receiving the first color difference signal B-Y and a positive input terminal for receiving an upper level signal X3 for the first color difference signal B-Y corresponding to red. The comparator 12 has a positive input terminal for receiving the first color difference signal B-Y and a negative input terminal for receiving a lower level signal X4 for the first color difference signal B-Y corresponding to red. The comparator 13 has a negative input terminal for receiving the second color difference signal R-Y and a positive input terminal for receiving an upper level signal Y4 for the second color difference signal R-Y corresponding to red. The comparator 14 has a positive input terminal for receiving the second color difference signal R-Y and a negative input terminal for receiving a lower level signal Y3 for the second color difference signal R-Y corresponding to red.

In the G hue detector 5, the comparator 11 has a negative input terminal for receiving the first color difference signal B-Y and a positive input terminal for receiving an upper level signal X5 for the first color difference signal B-Y corresponding to green. The comparator 12 has a positive Input terminal for receiving the first color difference signal B-Y and a negative input terminal for receiving a lower level signal X6 for the first color difference signal B-Y corresponding to green. The comparator 13 has a negative input terminal for receiving the second color difference signal R-Y and a positive input terminal for receiving an upper level signal Y5 for the second color difference signal R-Y corresponding to green. The comparator 14 has a positive input terminal for receiving the second color difference signal R-Y and a negative input terminal for receiving a lower level signal Y6 for the second color difference signal R-Y corresponding to green.

In the B hue detector 6, the comparator 11 has a negative input terminal for receiving the first color difference signal B-Y and a positive input terminal for receiving an upper level signal X2 for the first color difference signal B-Y corresponding to blue. The comparator 12 has a positive input terminal for receiving the first color difference signal B-Y and a negative input terminal for receiving a lower level signal X1 for the first color difference signal B-Y corresponding to blue. The comparator 13 has a negative input terminal for receiving the second color difference signal R-Y and a positive input terminal for receiving an upper level signal Y1 for the second color difference signal R-Y corresponding to blue. The comparator 14 has a positive input terminal for receiving the second color difference signal R-Y and a negative input terminal for receiving a lower level signal Y2 for the second color difference signal R-Y corresponding to blue.

In each of the individual hue detectors 4–6, the AND gate 15 supplies a first output signal to the AND gate 17 in response to comparison result signals from the comparators 11 and 12. Each AND gate 16 supplies a second output signal to the associated AND gate 17 in response to comparison result signals from the comparators 13 and 14. Each AND gate 17 supplies hue detection signals SR, SG and SB of R, G and B to the position concluding circuit 7 in response to the first and second output signals. The position concluding circuit 7 determines the position of the center O of the target T in accordance with the individual hue detection signals SR, SG and SB and outputs the result of the position detection to an external unit (not shown). The position of this center O is used to position the object to be sensed.

Figure 4:
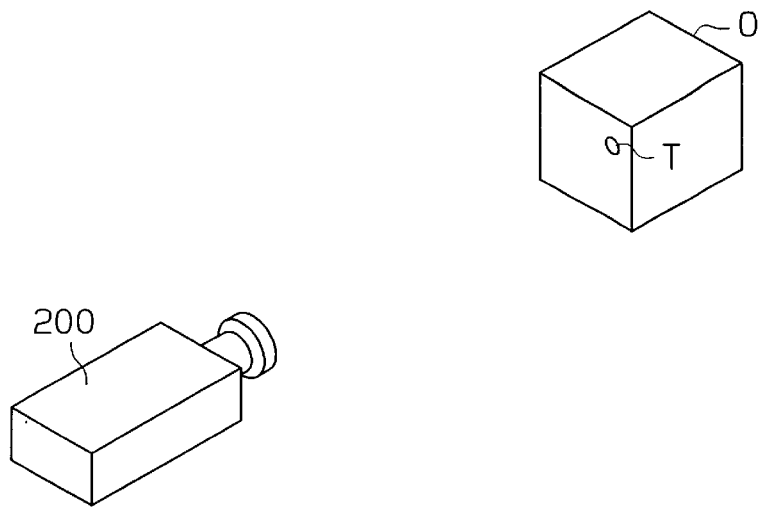
FIG. 4 is an exemplary diagram of a target and an object to be sensed by an image sensing apparatus.

An operation for detecting the position of the center O of the target T will now be described. First, as shown in FIG. 4, the target T is placed near the object O to be sensed by an image sensing device 200 in which the CCD solid state image sensing device 2 and the image signal processing apparatus 1 are incorporated. The CCD solid state image sensing device 2 senses the object O together with the target T and sands the image signal I of the object O including the target T to the signal processor 3.

Based on the image signal I of the target T sensed by the CCD solid state image sensing device 2, the hue detection signals SR, SG and SB as shown in FIG. 1B are produced from the individual hue detectors 4–6. This will be discussed below specifically. The R hue detector 4 outputs the hue detection signal SR of an H level when the levels of the first and second color difference signals B-Y and R-Y respectively lie in the ranges given by the equations (1) and (2). The G hue detector 5 outputs the hue detection signal SG of an H level when the levels of tho first and second color difference signals B-Y and R-Y respectively lie in the ranges given by the equations (3) and (4). The B hue detector 6 outputs the hue detection signal SB of an H level when the levels of the first and second color difference signals B-Y and R-Y respectively lie in the ranges given by the equations (5) and (6).

When receiving the hue detection signals SR, SG and SB as shown in FIG. 1B, the position concluding circuit 7 determines that the CCD solid state image sensing device 2 has sensed the target T, and determines the position of the center O of the target T from those hue detection signals SR, SG and SB. As apparent from the above, the position of the center O of the target T is detected generally from the results of the individual hue detections regardless of the type of the object which is to be sensed by the CCD solid state image sensing device 2. This ensures the accurate positioning of the object. It is very unlikely that the target T with concentric circles having the primary colors (R, G and B) exists in the natural or physical world. Thus, this target T is a good choice as a position detection mark.

Two possible ways of determining the position of the center O are as follows. (1) A frame memory for retaining data of state of the individual hue detection signals SR, SG and SB is provided in the position concluding circuit 7, The position of the center O of the target T is determined from the arrangement of the data held in the frame memory. (2) The individual hue detection signals SR, SG and SB are stored as corresponding address data during a specified period which corresponds to the horizontal sync signal and vertical sync signal for driving the CCD solid state image sensing device 2. The position of the center O of the target T is determined through arithmetic operations based on the address data.

The image signal processing apparatus 1 of this embodiment is also applicable to image processing apparatuses, such as an image input device for a personal computer, a pattern recognition apparatus and a product testing apparatus.

Figure 5:
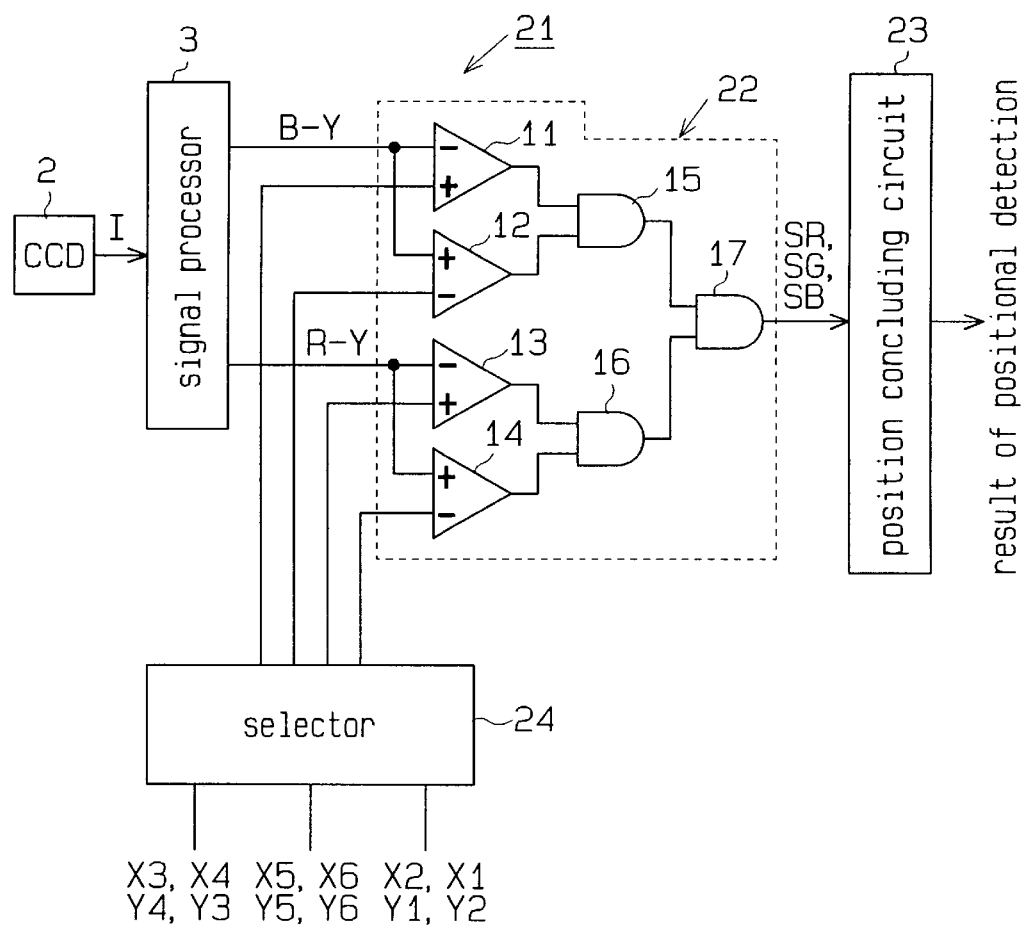
FIG. 5 is a block circuit diagram of an image signal processing apparatus according to the second embodiment of this invention.

An image signal processing apparatus according to the second embodiment of this invention will now be described referring to the accompanying drawings. To avoid a redundant description, like or same reference numerals are given to those components which are like or the same as the corresponding components of the first embodiment, As shown in FIG. 5, an image signal processing apparatus 21 has a signal processor 3, a hue detector 22, a position concluding circuit 23 and a selector 24. In the image signal processing apparatus 21, the signal processor 3, connected to the CCD solid state image sensing device 2 as in the image signal processing apparatus 1 of the first embodiment, produces first and second color difference signals B-Y and R-Y and supplies those signals to the hue detector 22. The vertical scan period (the period for the vertical scan) of the CCD solid state image sensing device 2 is 1/60 sec.

The hue detector 22 includes four comparators 11 to 14 and three 2-input AND gates 15 to 17.

The comparator 11 has a negative input terminal for receiving the first color difference signal B-Y and a positive input terminal connected to the selector 24. The comparator 12 has a positive input terminal for receiving the first color difference signal B-Y and a negative input terminal connected to the selector 24, The comparator 13 has a negative input terminal for receiving the second color difference signal R-Y and a positive input terminal connected to the selector 24. The comparator 14 has a positive input terminal for receiving the second color difference signal R-Y and a negative input terminal connected to the selector 24.

Figure 6:
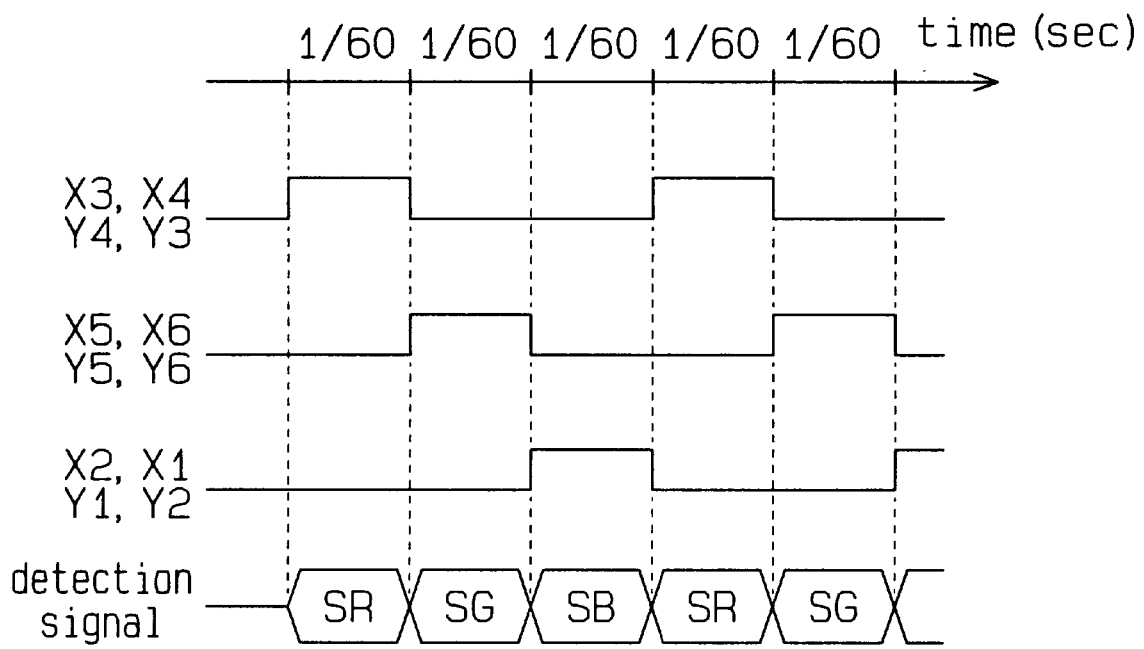
FIG. 6 is a waveform chart illustrating the operation of the image signal processing apparatus in FIG. 4.

The selector 24 receives a first signal group consisting of upper and lower level signals X3, X4, Y4 and Y3 of the first and second color difference signals B-Y and R-Y corresponding to red, which have been supplied from an external unit, a second signal group consisting of upper and lower level signals X5, X6, Y5 and Y6 of the first and second color difference signals B-Y and R-Y corresponding to green, and a third signal group consisting of upper and lower level signals X2, X1, Y2 and Y1 of the first and second color difference signals B-Y and R-Y corresponding to blue. As shown in FIG. 6, the selector 24 sequentially supplies the first to third signal groups to the hue detector 22 every 1/60 sec. Specifically, the selector 24 outputs the first signal group (X3, X4, Y4, Y3) for 1/60 sec, then outputs the second signal group (X5, X6, Y5, Y6) for 1/60 sec, and finally outputs the third signal group (X2, X1, Y1, Y2) for 1/60 sec. The reason for outputting the first to third signal groups each for 1/60 sec is to match the operational period of the image signal processing apparatus 21 with the vertical scan period of the CCD solid state image sensing device 2.

The AND gate 17 of the hue detector 22 sequentially supplies the hue detection signals SR, SG and SB for R, G and B to the position determining circuit 23 each for 1/60 sec. The position concluding circuit 23 determines the position of the center O of the target T in accordance with the hue detection signals SR, SG and SB and supplies the results of the positional detection to an external unit.

As the image signal processing apparatus 21 of the second embodiment operates one hue detector 21 in a time divisional manner, it has fewer components than the image signal processing apparatus 1 of the first embodiment which requires three hue detectors, and thus the circuit scale can be reduced.

Although only two embodiments of the present invention has been described herein, it should be apparent to those skilled in the art that the present invention may be embodied in many other specific forms without departing from the spirit or scope of the invention, Particularly, it should be understood that the invention may be embodied in the following forms.

The individual hues of the first to third areas Ta(R) to Tc(B) of the target T may vary depending on the illumination condition at the image sensing time. A change in each hue hinders the accurate detection of the position of the center O of the target T. To avoid this problem, the individual areas Ta(R) to Tc(B) of the target T may emit light. In this case, 1) an LED module having a plurality of light emitting diodes of colors corresponding to the first to third areas Ta(R) to Tc(B) should be provided or 2) the first to third areas Ta(R) to Tc(B) should be formed of transparent materials (synthetic resin, glass or the like) colored with colors corresponding to the first to third areas Ta(R) to Tc(B) and the transparent materials should be illuminated from the back by an incandescent lamp.

The signal processor 3 and the comparators 11–14 may be constituted by a digital circuit which processes the individual color difference signals B-Y and R-Y as digital data.

The signal processing performed by the circuits 3–7 and 22–24 may be replaced with software-based signal processing using a CPU.

Therefore, the present examples and embodiment are to be considered as illustrative and not restrictive and the invention is not to be limited to the details given herein, but may be modified within the scope and equivalence of the appended claims.

What is claimed is:

1. An image signal processing apparatus for use in an image sensing apparatus having an image sensing device for sensing an image of an object together with a target having a plurality of predetermined colors of different hues to produce an image signal, said image signal processing apparatus comprising:

a color difference signal generation circuit, connected to said image sensing device, for receiving said image signal and producing color difference signals;

a detection circuit, connected to said color difference signal generation circuit, for receiving said color difference signals, said detection circuit including at least two comparators which compare said color difference signals with a lower level signal and an upper level signal according to said predetermined colors, wherein said detection circuit detects if said color difference signals lies between the lower level and the upper level and produces detection signals corresponding to said predetermined colors based on comparison results; and a concluding circuit, connected to said detection circuit, for receiving said detection signals and concluding a position of said target in accordance with said detection signals.

2. The image signal processing apparatus according to claim 1, wherein said target has a plurality of concentric circles and a single color is assigned to each of areas defined between adjoining concentric circles.

3. The image signal processing apparatus according to claim 1, wherein said target has first to third concentric circles, a first color is assigned to an area in said first concentric circle that is closest to the center, a second color is assigned to an area lying between said first concentric circle and said second concentric circle that is located outward of said first concentric circle, and a third color is assigned to an area lying between said second concentric circle and said third concentric circle that is located outward of said second concentric circle.

4. The image signal processing apparatus according to claim 3, wherein said first to third colors are red, green and blue.

5. The image signal processing apparatus according to claim 1, wherein a plurality of detection circuits are provided in association with said predetermined colors, are connected in parallel to said generation circuit, and produce a plurality of detection signals corresponding to associated colors in parallel.

6. The image signal processing apparatus according to claim 1, wherein said detection circuit operates in a time divisional manner, screen by screen, in association with said predetermined colors, to produce detection signals corresponding to associated colors in serial.

* * * * *